Feb. 21, 1928.　　　　　　　　　　　　　　　　　1,660,195
F. J. HEIDEMAN
SHAFT COUPLING
Filed Jan. 18, 1926
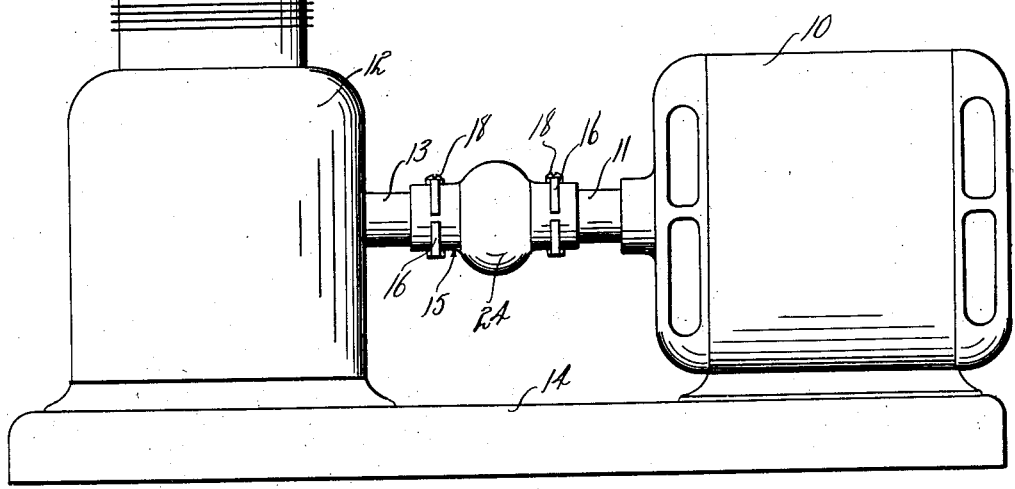
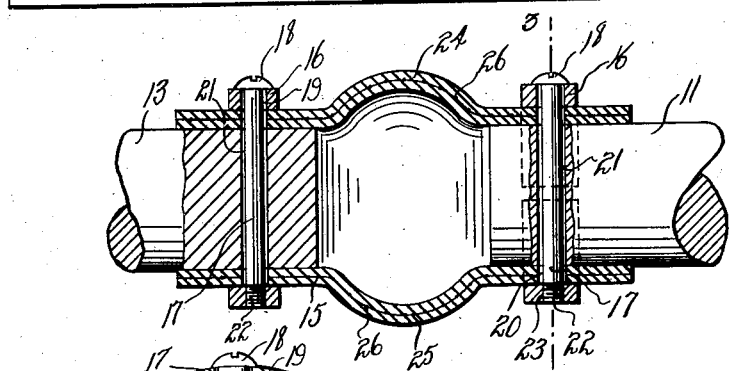
Inventor
Fred J. Heideman
Attorneys Patented Feb. 21, 1928.

1,660,195

UNITED STATES PATENT OFFICE.

FRED J. HEIDEMAN, OF DETROIT, MICHIGAN, ASSIGNOR TO T. C. WHITEHEAD, OF DETROIT, MICHIGAN.

SHAFT COUPLING.

Application filed January 18, 1926. Serial No. 82,117.

This invention relates to shaft couplings and more particularly to a coupling designed to compensate for disalignments between the shafts to be connected, for absorbing torsional strains, and further for absorbing other harmful and disastrous vibrations and movements which might be transmitted from a driving to a driven shaft or from a driven to a driving shaft.

While it will be readily apparent to those skilled in this particular art that the herein described coupling is applicable with equal facility to various types of apparatus the invention finds particular utility in connection with household mechanical refrigerating units wherein a compressor or pump or other working unit is driven directly from a power unit such as an electric motor and wherein the working unit and power unit are mounted upon the same base or at least in substantial alignment and directly connected for the transmission of power. In such an instance the herein described coupling affords means for compensating for any disalignment for instance between the motor shaft and the compressor or pump crank shaft and for absorbing or otherwise relieving torsional strains and stresses which in the course of operation are likely to be transmitted from one of the shafts to the other.

The invention finds further utility when used in connection with this type of apparatus as it freely permits armature oscillations which thereby lengthens the life of the commutator as well as that of the brushes. These oscillations are permitted and absorbed by the herein described coupling because the coupling is constructed to be resilient longitudinally thereof.

The invention has also among its objects to simplify, render more efficient and improve generally devices of this character and these as well as other objects, advantages and novel details of construction will be made more apparent as this description proceeds especially when considered in connection with the accompanying drawings, wherein Figure 1 is a side elevation of an apparatus showing a driving and driven shaft and illustrating the application of my invention.

Figure 2 is an enlarged fragmentary longitudinal sectional view of a structure illustrated in Figure 1 showing the coupling construction more in detail, and Figure 3 is a transverse sectional view taken substantially on the plane indicated by the line 3—3 in Figure 2.

Referring now particularly to the drawings wherein like reference characters indicate like parts it will be noted that in Figure 1 I have illustrated a power unit herein shown as an electric motor 10 having a driving shaft 11 and a work unit 12, such for instance as a compressor or pump having a crank shaft 13 which constitutes the driven shaft. The power unit 10 and the work unit 12 are adapted to be mounted for a direct driving connection therebetween and in the embodiment herein shown they are mounted upon a common base 14.

The coupling for connecting the driving and driven shafts 11 and 13 respectively consists essentially of a sleeve 15 formed preferably of a flexible or semi-flexible material such for instance as rubber, rubber composition, rubber fabric or the like.

The ends of the sleeve 15 are adapted to surround and snugly engage the spaced adjacent ends of the shafts 11 and 13 and the sleeve is removably clamped to the ends of these shafts by means of clamping members each comprising a pair of clamping elements 16 of semiring-like construction adapted to circumferentially embrace the end of the sleeve 15 and to be held in place by means of a clamping bolt 17 headed as at 18, which bolt passes freely through an aperture 19 in one of the clamping elements 16 and also freely through aligned apertures 20 in the coupling sleeve and through a passage-way 21 formed transversely of the ends of the shaft. The bolt is threaded as shown at 22 for engagement with a threaded aperture 23 formed in the other clamping elements 16. Thus when the clamping elements 16 are placed into position the bolt 17 may be inserted through the aligned apertures 19, 20 and 21 and threaded into the aperture 23 of the other clamping member whereupon the clamping elements 16 will be brought into clamping relation with reference to the coupling sleeve and shaft end. Furthermore by passing the bolt 17 through the shaft end a positive rotative connection is effected between the shaft end and the coupling sleeve. Obviously the coupling is readily attachable and detachable.

The sleeve 15 is formed with a central portion 24 which is bowed or curved longitudinally of the sleeve this portion extending circumferentially of the sleeve as clearly illustrated in the drawings. This curved or bowed portion 24 is disaligned longitudinally with respect to the remainder of the sleeve and compensates for and absorbs certain vibrations and stresses to be referred to more fully hereinafter. It should be noted that the bowed or enlarged central portion 24 of the sleeve is arranged intermediate the spaced ends of the shafts 11 and 13.

In practice it has been found most desirable to form the coupling sleeve 15 of rubber or rubber composition and when using such material it is desirable to reinforce the coupling sleeve by means of a substantially fabric-like material composed of a plurality of longitudinal extending strands 25 tied together or united by means of circumferentially arranged strands 26. Preferably the longitudinally extending strands 25 are spaced relatively close together while the circumferentially arranged strands 26 are more distantly spaced, it being the practice to employ only a sufficient number of strands 26 to tie the longitudinal strands into a fabric-like structure. Thus the longitudinal strands 25 predominate and reinforce the coupling sleeves against longitudinal tension strains and against torsional strains and stresses, while the circumferential strands 26 do not in any manner impair the compressibility or flexibility of the coupling as regards compression strains.

From the foregoing it will be apparent that with a coupling constructed in accordance with this invention a disalignment between the shafts 11 and 13 will be compensated for and that torsional strains and stresses will be absorbed by the coupling and not transmitted from either of the shafts to the other. Furthermore the coupling by reason of its longitudinal flexibility permits oscillations of the armature and thereby eliminates to a great extent wear on the commutator and brushes. While the coupling has been described as being formed preferably of certain materials it falls within the scope of this invention to use other materials having the characteristics of those herein mentioned. Furthermore while the sleeve has been described as being reinforced with a fabric-like material it will be obvious that such reinforcement may be modified or eliminated as the conditions dictate.

Therefore reservation is made to make such changes in the details of construction and arrangement of parts as may come within the purview of the accompanying claim.

What I claim as my invention is:

In a shaft coupling, the combination with the adjacent ends of shafts, of a coupling sleeve connecting said ends and formed of rubber or the like reinforced by having imbedded therein a fabric-like material in which the longitudinal strands exceed the circumferential strands in number and afford the requisite tensile strength of the flexible coupling, and exterior circumferential clamping means embracing the end portions of the coupling sleeve and gripping all of the terminals of the longitudinal strands for preventing displacement of the same in the flexible actions of the sleeve.

In testimony whereof I affix my signature.

FRED J. HEIDEMAN.